US012503996B2

(12) United States Patent
Singh et al.

(10) Patent No.: US 12,503,996 B2
(45) Date of Patent: *Dec. 23, 2025

(54) WIND TURBINE BLADE WITH LEEWARD REINFORCEMENT STRUCTURES AND WINDWARD REINFORCEMENT STRUCTURES

(71) Applicant: Vestas Wind Systems A/S, Aarhus N (DK)

(72) Inventors: Gurmukh Singh, Skjern (DK); Rens Christiaan Verhoef, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/573,652

(22) PCT Filed: Jun. 28, 2022

(86) PCT No.: PCT/DK2022/050151
§ 371 (c)(1),
(2) Date: Dec. 22, 2023

(87) PCT Pub. No.: WO2023/274482
PCT Pub. Date: Jan. 5, 2023

(65) Prior Publication Data
US 2024/0301860 A1    Sep. 12, 2024

(30) Foreign Application Priority Data

Jun. 30, 2021  (DK) .............................. PA202170345

(51) Int. Cl.
*F03D 1/06* (2006.01)
(52) U.S. Cl.
CPC ......... *F03D 1/0681* (2023.08); *F03D 1/0682* (2023.08); *F03D 1/0675* (2013.01);
(Continued)

(58) Field of Classification Search
CPC .... F03D 1/0675; F03D 1/0683; F03D 1/0681; F03D 1/0682; F03D 1/069; F03D 1/0677; F05B 2240/302
See application file for complete search history.

(56) References Cited

U.S. PATENT DOCUMENTS 7,942,637 B2 * 5/2011 Akhtar .................. F03D 1/0675
29/889.72
8,517,689 B2 * 8/2013 Kyriakides ........... F03D 1/0675
416/226

(Continued)

FOREIGN PATENT DOCUMENTS

CN         102619705 A      8/2012
DE   202011051341 U1 * 12/2011  ........... F03D 1/0675
(Continued)

OTHER PUBLICATIONS

English translation of EP3376024A1 (Year: 2018).*
(Continued)

*Primary Examiner* — Courtney D Heinle
*Assistant Examiner* — Esley Le Fisher
(74) *Attorney, Agent, or Firm* — Wood Herron & Evans LLP

(57) ABSTRACT

The present disclosure provides a blade for a wind turbine, where the blade extends in a lengthwise direction between a root end and a tip end of the blade. The blade comprises a leeward shell portion and a windward shell portion, each of the shell portions defining respective inner and outer surfaces extending in a chordwise direction between a leading edge of the blade and a trailing edge of the blade. The blade further comprises a first windward reinforcement structure, a first leeward reinforcement structure, a second windward reinforcement structure, and a second leeward reinforcement structure, the reinforcement structures being arranged internally within the blade and extending in the lengthwise
(Continued)

direction of the blade. The second windward and second leeward reinforcement structures are arranged closer to the trailing edge than the first windward reinforcement structure and the first leeward reinforcement structure, respectively, and the second windward reinforcement structure is longer than the second leeward reinforcement structure in the lengthwise direction.

7 Claims, 3 Drawing Sheets

(52) U.S. Cl.
  CPC ........ *F03D 1/069* (2023.08); *F05B 2240/301* (2013.01); *F05B 2240/304* (2020.08)

(56) References Cited

U.S. PATENT DOCUMENTS

| | | | | |
|---|---|---|---|---|
| 8,702,397 | B2 * | 4/2014 | Babu | F03D 1/0675 416/226 |
| 8,734,110 | B2 * | 5/2014 | Kuroiwa | F03D 80/30 416/224 |
| 10,072,632 | B2 * | 9/2018 | Yarbrough | B32B 1/00 |
| 10,487,797 | B2 * | 11/2019 | Hancock | B29C 70/865 |
| 10,519,928 | B2 * | 12/2019 | Yarbrough | F03D 1/065 |
| 2011/0142662 | A1 * | 6/2011 | Fritz | F03D 1/0675 416/233 |
| 2012/0141286 | A1 * | 6/2012 | Kyriakides | F03D 1/0675 416/233 |
| 2013/0149154 | A1 * | 6/2013 | Kuroiwa | B29C 70/304 416/146 R |
| 2014/0234114 | A1 * | 8/2014 | Schibsbye | F03D 1/0675 416/226 |
| 2014/0301859 | A1 * | 10/2014 | Hancock | F03D 1/0675 156/60 |
| 2017/0002791 | A1 * | 1/2017 | Yarbrough | F03D 1/0675 |
| 2017/0058866 | A1 * | 3/2017 | Caruso | F03D 1/0675 |
| 2018/0355843 | A1 | 12/2018 | Yarbrough | |

FOREIGN PATENT DOCUMENTS

| | | | |
|---|---|---|---|
| EP | 3208459 | A1 | 8/2017 |
| EP | 3376024 | A1 * | 9/2018 |
| GB | 2497578 | A | 6/2013 |
| WO | 2013087078 | A1 | 6/2013 |
| WO | 2015067279 | A1 | 5/2015 |
| WO | WO-2018224106 | A1 * | 12/2018 |
| WO | 2021110225 | A1 | 6/2021 |

OTHER PUBLICATIONS

English translation of DE202011051341U1 (Year: 2011).*
Danish Patent and Trademark Office, Search and Exam Report issued in DK Patent App. No. PA 2021 70345, dated Dec. 16, 2021 (7 pages).
International Searching Authority, Written Opinion and Search Report issued in PCT/DK2022/050151, dated Oct. 10, 2022 (13 pages).

* cited by examiner

A-A

B-B

WIND TURBINE BLADE WITH LEEWARD REINFORCEMENT STRUCTURES AND WINDWARD REINFORCEMENT STRUCTURES

FIELD OF THE DISCLOSURE

The present disclosure relates to a wind turbine blade, and more specifically to a wind turbine blade comprising a plurality of reinforcement structures internally within the blade.

BACKGROUND OF THE DISCLOSURE

Traditionally, wind turbine blades are made from an outer shell and an inner hollow elongate spar of generally rectangular cross section. The spar serves to transfer loads from the rotating blade to the hub of the wind turbine. Such loads include tensile and compressive loads directed along the length of the blade arising from the circular motion of the blade and loads arising from the wind which are directed along the thickness of the blade, i.e. from the windward side of the blade to the leeward side.

DESCRIPTION OF THE DISCLOSURE

It is an object of embodiments of the disclosure to provide an improved wind turbine blade.

According to an aspect, the disclosure provides a blade for a wind turbine, the blade extending in a lengthwise direction between a root end and a tip end of the blade, the blade comprising:
- a leeward shell portion and a windward shell portion, each of the shell portions defining respective inner and outer surfaces extending in a chordwise direction between a leading edge of the blade and a trailing edge of the blade, wherein the blade extends in a thickness direction between the leeward shell portion and the windward shell portion;
- a main reinforcement structure internally within the blade, the main reinforcement structure comprising a first windward reinforcement structure engaging the windward shell portion and extending in the lengthwise direction of the blade and a first leeward reinforcement structure engaging the leeward shell portion and extending in the lengthwise direction of the blade;
- a rear reinforcement structure internally within the blade, the rear reinforcement structure comprising a second windward reinforcement structure engaging the windward shell portion and extending in the lengthwise direction of the blade and a second leeward reinforcement engaging the leeward shell portion and extending in the lengthwise direction of the blade,
- wherein the rear reinforcement structure is arranged closer to the trailing edge than the main reinforcement structure; and
- wherein the second windward reinforcement structure is longer than the second leeward reinforcement structure in the lengthwise direction.

The blade may be attached to a wind turbine which may comprise a plurality of blades, such as three blades which may be configured to interact with the passing air flow to produce lift that causes a hub to rotate about its longitudinal axis. Wind speed in excess of a minimum level may activate the rotor and allow it to rotate within a plane substantially perpendicular to the direction of the wind. The rotation can be converted to electric power by a generator and is usually supplied to the utility grid.

The blade extends in a lengthwise direction between a root end and a tip end of the blade, where the root end may be configured for attachment to the hub.

The blade comprises a leeward shell portion and a windward shell portion, where each of the shell portions defining respective inner and outer surfaces extend in a chordwise direction between a leading edge of the blade and a trailing edge of the blade. The inner surface of the leeward shell portion may face the inner surface of the windward shell portion. A hollow blade may be defined by the two shell portions.

The leeward shell portion and the windward shell portion may be adhesively bonded at the leading edge and the trailing edge. Alternatively, the blade may be manufactured in a 'single shot' process where the leeward shell portion and the windward shell portion are integrally formed.

The blade extends in a thickness direction between the leeward shell portion and the windward shell portion, where the thickness may vary both along the lengthwise direction of the blade and along the chordwise direction.

To increase the strength of the blade, the blade comprises a main reinforcement structure internally within the blade. The main reinforcement structure comprises a first windward reinforcement structure which engages the windward shell portion, and additionally, a first leeward reinforcement structure which engages the leeward shell portion.

To increase the strength of the blade at the trailing edge, the blade further comprises a rear reinforcement structure. The rear reinforcement structure comprises a second windward reinforcement structure internally within the blade and a second leeward reinforcement structure internally within the blade, the second windward reinforcement structure engaging the windward shell portion and the second leeward reinforcement structure engaging the leeward shell portion, where the second windward and second leeward reinforcement structures extend in the lengthwise direction.

The rear reinforcement structure is arranged closer to the trailing edge than the main reinforcement structure.

Particularly, the second leeward and second windward reinforcement structures may be provided to prevent buckling at the trailing edge.

Towards the tip end of the blade, the loads on the blade (i.e. flapwise loads and edgewise loads) are lower than towards the root end of the blade. Hence, the need for reinforcement towards the tip end of the blade may be decreased. Reinforcement of the trailing edge towards the tip end of the blade may be facilitated by arranging a second reinforcement structure only at the windward shell. In other words, at a given lengthwise location on the blade (towards the tip end) a second reinforcement structure is only provided engaging the windward shell, and there is no second reinforcement structure engaging the leeward shell. This may be achieved by providing a second windward reinforcement structure being longer than a second leeward reinforcement structure in the lengthwise direction. i.e. the rear reinforcement structure comprises two reinforcements structures of different length.

The blade forms an airfoil in cross section. An airfoil for a wind turbine blade towards the tip end of the blade has a leeward surface and a windward surface. The leeward surface in a rear half of the airfoil is relatively flat whereas the windward surface in the rear half of the airfoil is relatively curved. In particular, the windward surface in the rear half of the airfoil may have a concave curvature (as viewed from outside of the airfoil).

The second windward reinforcement structure and the second leeward reinforcement structure are provided in the rear of the airfoil cross section as they provide support to the trailing edge.

The second windward reinforcement structure and the second leeward reinforcement structure are relatively thin structures. That is their thickness (as measured in the thickness direction of the blade) is less than their length and width. As the second windward reinforcement structure and the second leeward reinforcement structures are thin structures, they may be prone to buckling.

As the windward shell is curved (compared to the leeward shell), the second windward reinforcement structure has an improved performance towards buckling as it is positioned on a curved surface. Therefore, towards the tip end of the blade, the second windward reinforcement structure is provided on the relatively curved windward shell and no second leeward reinforcement structure is provided on the relatively flat leeward shell. This has the effect of avoiding buckling of the second windward reinforcement structure towards the tip end of the blade.

The phrase "towards the tip end of the blade" means in an outboard portion of the blade. For example, as measured from the tip end, in the outer 50%, or 40%, 30% or 20% of the blade in the lengthwise direction of the blade.

Furthermore, the application of a rear reinforcement structure comprising a second windward and a second leeward reinforcement structure reduces the strain levels along the trailing edge. If the blade only comprises a main reinforcement structure comprising a first windward reinforcement structure and a first leeward reinforcement structure, the neutral axis of the blade would be closer to the main reinforcement structure, whereby the strain levels at the trailing edge would be higher due to the larger distance to the neutral axis. The application of a rear reinforcement structure moves the neutral axis of the blade to a position closer to the trailing edge in the chordwise direction, whereby the strain levels along the trailing edge can be reduced.

In one embodiment, the blade may be made using a vacuum assisted resin-infusion process by use of a mould for each of the windward and leeward shell portions, respectively. A glass-fibre layer may be arranged in the mould to form the outer skin of the blade. A plurality of panels of foam or balsa may be arranged on top of the glass-fibre layer to form a sandwich panel core. The sandwich panels may be spaced apart relative to one another to define a channel in between in the lengthwise direction of the blade. The first windward reinforcement structure and the first leeward reinforcement structure may each be arranged in a channel in each of the windward and leeward shell portions. The second windward reinforcement structure and the second leeward reinforcement structure may likewise each be arranged in a channel in each of the windward and leeward shell portions.

After positioning of the first windward, the first leeward, the second windward, and the second leeward reinforcement structures, a second glass-fibre layer may be arranged on top of the sandwich panels and the reinforcement structures. The second glass-fibre layer may form an inner skin of the blade.

By use of vacuum, resin may be supplied to each of the moulds. The resin may infuse between the various laminate layers and may fill any gaps in the laminate layup. Once sufficient resin has been supplied to the mould, the mould may be heated whilst the vacuum is maintained to cure the resin and bond the various layers together to form the windward and leeward shell portions of the blade. An adhesive may be applied along the leading and trailing edges of the shell portions and the shell portions are bonded together to form the complete blade.

It should be understood that the above description is of one embodiment, and that the blade may alternatively be formed by another process. As an example, the first windward reinforcement structure and the first leeward reinforcement structure and/or the second windward reinforcement structure and the second leeward reinforcement structure may each be formed as a separate element which may subsequently be attached to the windward shell portion and the leeward shell portion, such as an inner surface hereof, respectively.

The first windward and first leeward reinforcement structures extend in the lengthwise direction of the blade and have a thickness in the thickness direction of the blade. The first windward and the first leeward reinforcement structures may form a pair and may be arranged so that they substantially face each other when the shell portions are assembled to form the complete blade. Thus, the first windward and first leeward reinforcement structures may be arranged substantially opposite to each other when the blade is assembled.

By arranged substantially opposite to each other, should be understood, that a projection of the first windward reinforcement structure and a projection of the first leeward reinforcement on a plane extending between the leading edge and the trailing edge may overlap each other at least 80%, such as 90%, such as 95% in a cross-section in the chordwise direction.

Likewise, the second windward reinforcement structure and the second leeward reinforcement structure may form a pair and may be arranged so that they substantially face each other when the shell portions are assembled to form the complete blade.

To further reinforce the blade, a first shear web extending in the lengthwise direction of the blade may bridge the first windward and the first leeward reinforcement structures. The first shear web may in combination with the first windward and the first leeward reinforcement structures form an I-beam structure, also called a spar structure where the first windward and the first leeward reinforcement structures form the spar caps. The I-beam structure/the spar structure may transfer loads effectively from the rotating blade to the hub of the wind turbine. The first windward and the first leeward reinforcement structures may in particular transfer tensile and compressive bending loads, whilst the first shear web may transfer shear stresses in the blade.

Likewise, a second shear web may extend in the lengthwise direction of the blade, which second shear web may bridge the second windward and the second leeward reinforcement structures. Thus, the second shear web may in combination with the second windward and the second leeward reinforcement structures form a second I-beam structure/a second spar structure where the second windward and the second leeward reinforcement structures form the spar caps of the second spar structure.

As the need for reinforcement of the trailing edge at the tip is reduced, a reinforcement structure may be arranged only at the windward shell. Thus, a length of the second leeward reinforcement structure may be in the range of 80-95% of a length of the second windward reinforcement structure.

Preferably, the second leeward reinforcement structure and the second windward reinforcement structure start at the same lengthwise position towards the root end of the blade. For example, the second leeward reinforcement structure and the second windward reinforcement structure may both start at 10% L. The second windward reinforcement structure may end at 75% L and the second leeward reinforcement structure may end at 65% L. Alternatively, the second windward reinforcement structure may end at 70% L and the second leeward reinforcement structure may end at 60% L. In a further alternative, the second windward reinforcement structure may end at 85% L and the second leeward reinforcement structure may end at 75% L. The start position of the second leeward reinforcement structure and the second windward reinforcement structure may vary from the 10% L, e.g. based on thickness and length of the blade.

The blade has been expressed in terms of a length 'L' where 0% L is at the root end of the blade and 100% L is at the tip end of the blade.

The length of second windward reinforcement structure may be in the range of 55-75% of the length of the blade, whereas the length of the second leeward reinforcement structure may be in the range of 45-65% of the length of the blade.

The second windward reinforcement structure and the second leeward reinforcement structure may each be formed by a plurality of layers. In one embodiment, the second windward and the second leeward reinforcement structures may be formed by layers of pultruded elements, such as pultruded strips of composite material, which may be carbon-fibre reinforced plastic. The thickness of each layer may be in the range of 3-10 mm, such as 4-8 mm. An advantage of a thickness of each layer in this range may be that the pultruded strips may be supplied in a roll.

Theoretically, the length of the second windward reinforcement structure and the length of the second leeward reinforcement structures could be substantially equal, e.g. by providing half of the needed reinforcement as a second windward reinforcement structure and half of the reinforcement as the second leeward reinforcement structure towards the tip end of the blade, e.g. by providing an equal thickness of reinforcement at both the windward shell and the leeward shell, such as a single pultrusion layer or two pultrusion layers at each shell. A reinforcement of this thickness may however be too thin to prevent buckling of the second leeward or second windward reinforcement structures.

The second leeward reinforcement structure may be terminated, and the second windward reinforcement structure may continue to thereby provide a second windward reinforcement structure being longer than the second leeward reinforcement structure. In this way, the thickness of the second windward reinforcement structure can be increased as the material that would theoretically have been included in the second leeward reinforcement structure is added to the second windward reinforcement structure. This increases the thickness of the second windward reinforcement structure and helps to prevent buckling.

The second windward reinforcement structure being longer than the second leeward reinforcement structure in the lengthwise direction may be achieved by terminating a tip end of the second leeward reinforcement structure at a position closer to the root end than a tip end of the second windward reinforcement structure.

It should be understood that the respective thicknesses of the second leeward reinforcement structure and the second windward reinforcement structure may decrease towards the tip end of the blade in the lengthwise direction in a first section of the blade as the need for reinforcement at the trailing edge may decrease towards the tip end where the thickness of the blade is smaller.

The decrease of the thickness of the second leeward reinforcement structure and the second windward reinforcement structure may be achieved by termination of one of more layers forming or forming part of the second leeward and the second windward reinforcement structures in the lengthwise direction of the blade. When a layer is terminated, the number of layers continuing in the lengthwise direction of the blade is reduced, whereby the thickness may be decreased.

Termination of one layer may e.g. be carried out by cutting a layer. When cutting or otherwise terminating a layer, the terminated end may be chamfered. In one embodiment, one or more of the layers may be chamfered at both ends. Chamfered layers may facilitate stress transfer from one layer to an adjacent layer. The chamfered layers may thus be terminated by a tapered section, e.g. with a taper ratio in the range of 1:100.

Alternatively, the termination of a layer may be a cut substantially perpendicular to the lengthwise direction.

The decrease of the thickness of the second windward reinforcement structure may be staggered with respect to the decrease of the thickness of the second leeward reinforcement structure at least at one position within the first section.

By staggering the decrease in thickness, it can be ensured that the distance between the second leeward and second windward reinforcement structures continues to decrease towards the tip end or at least that any increase in distance is minimised. This reduces the shear forces in the web and in a bond line between the second shear web and the second leeward and second windward reinforcement structures compared to a non-staggered arrangement. The reduction in shear forces leads to a more robust spar structure and can also lead to less material being used and hence a reduced mass.

As described above, a second windward reinforcement structure being longer than a second leeward reinforcement structure in the lengthwise direction may as an example be achieved by terminating the layers forming the second leeward reinforcement structure without terminating all the layers forming the second windward reinforcement structure.

In one embodiment, the blade may further comprise an additional leeward reinforcement structure arranged in continuation of the second leeward reinforcement structure in the lengthwise direction, the additional leeward reinforcement structure being arranged closer to the tip end than the second leeward reinforcement structure, the additional leeward reinforcement structure being formed of a different material to the second leeward reinforcement structure.

Preferably, the second leeward and second windward reinforcement structures are formed of the same material. Preferably, such material is carbon-fibre reinforced plastic, which may be in the form of pultruded strips.

The additional leeward reinforcement structure is a different material to the second leeward reinforcement structure and preferably has a lower stiffness modulus in comparison to the material of the second leeward reinforcement structure. For example, the additional leeward reinforcement structure may be formed from glass-fibre reinforced plastic. The glass-fibre material is preferably provided in the form of dry mats. Such mats may then be infused with resin during the manufacture of the blade.

The second leeward reinforcement structure may transition into the additional leeward reinforcement structure so that there is not an abrupt change in stiffness in the blade structure. Thus, the outer end of the second leeward reinforcement structure in the lengthwise direction, i.e. the end toward the tip end, may have a shape matching an end portion of the additional reinforcement structure at the transition.

The additional leeward reinforcement structure may support the second shear web along the length of the blade where only the second windward reinforcement structure is arranged.

As described, the main reinforcement structure comprises a first windward reinforcement structure and a first windward reinforcement structure. However, the main reinforcement structure may comprise further reinforcement structures on the leeward and windwards shells, and the main reinforcement structure may be provided in the form of a box beam rather than an I-beam.

The rear reinforcement structure is the reinforcement structure arranged nearest the trailing of the blade. In an example, the rear reinforcement structure may be located at chordwise location of at least 70%, such as at least 75%, at least 80%, at least 85% or at least 95%. In this context, the leading edge has a chordwise position of 0% and the trailing edge has a chordwise position of 100%.

BRIEF DESCRIPTION OF THE DRAWINGS

Embodiments of the disclosure will now be further described with reference to the drawings, in which.

DETAILED DESCRIPTION OF THE DRAWINGS

It should be understood that the detailed description and specific examples, while indicating embodiments of the disclosure, are given by way of illustration only, since various changes and modifications within the spirit and scope of the disclosure will become apparent to those skilled in the art from this detailed description.

Figure 1:
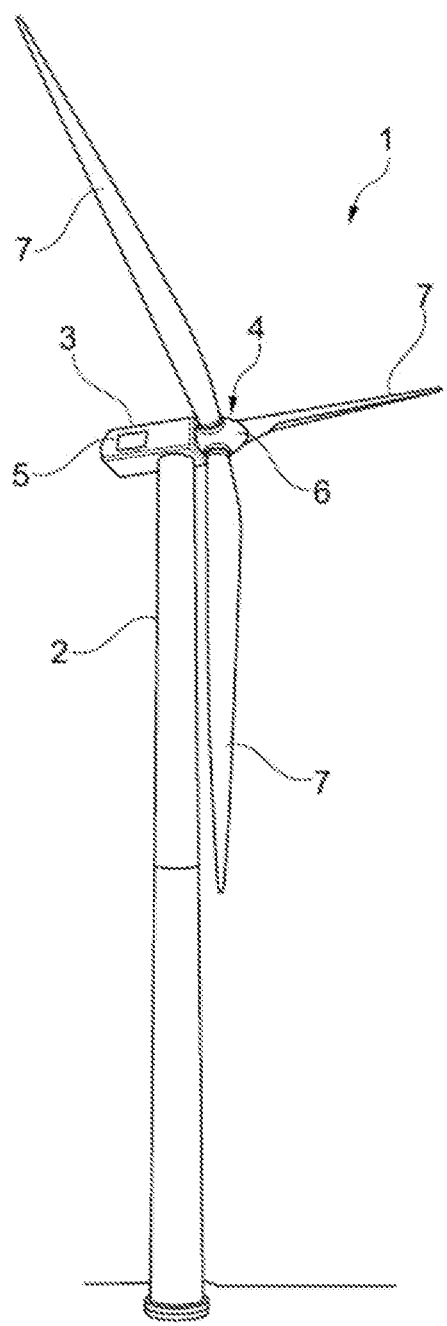
FIG. 1 illustrates the main structural components of a wind turbine.

FIG. 1 illustrates a typical wind turbine 1 comprising a tower 2, a nacelle 3 mounted at top of the tower 2 and a rotor 4 operatively coupled to a generator 5 within the nacelle 3. The wind turbine 1 converts kinetic energy of the wind into electrical energy. In addition to the generator 5, the nacelle 3 houses the various components required to convert the wind energy into electrical energy and also the various components required to operate and optimize the performance of the wind turbine 1. The tower 2 supports the load presented by the nacelle 3, the rotor 4, and other wind turbine components within the nacelle 3.

The rotor 4 includes a central hub 6 and three elongated blades 7 extending radially outward from the central hub 6. In operation, the blades 7 are configured to interact with the passing air flow to produce lift that causes the central hub 6 to rotate about its longitudinal axis. Wind speed in excess of a minimum level will activate the rotor 4 and allow it to rotate within a plane substantially perpendicular to the direction of the wind. The rotation is converted to electric power by the generator 5 and is usually supplied to the utility grid.

Figure 2A:
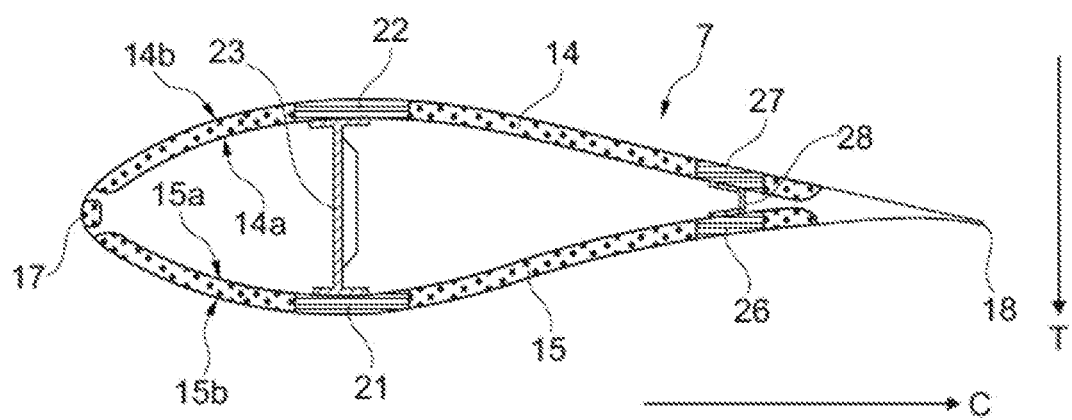
FIGS. 2A and 2B illustrate two different cross-sections through an embodiment of a wind turbine blade.
Figure 2B:
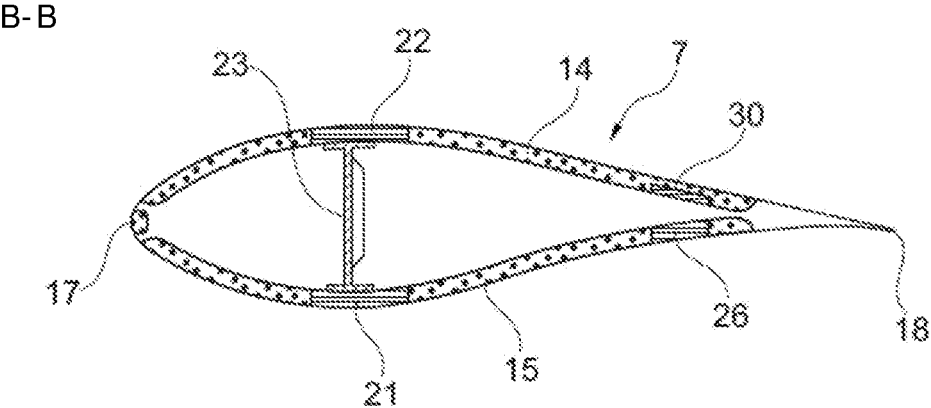
Figure 3:
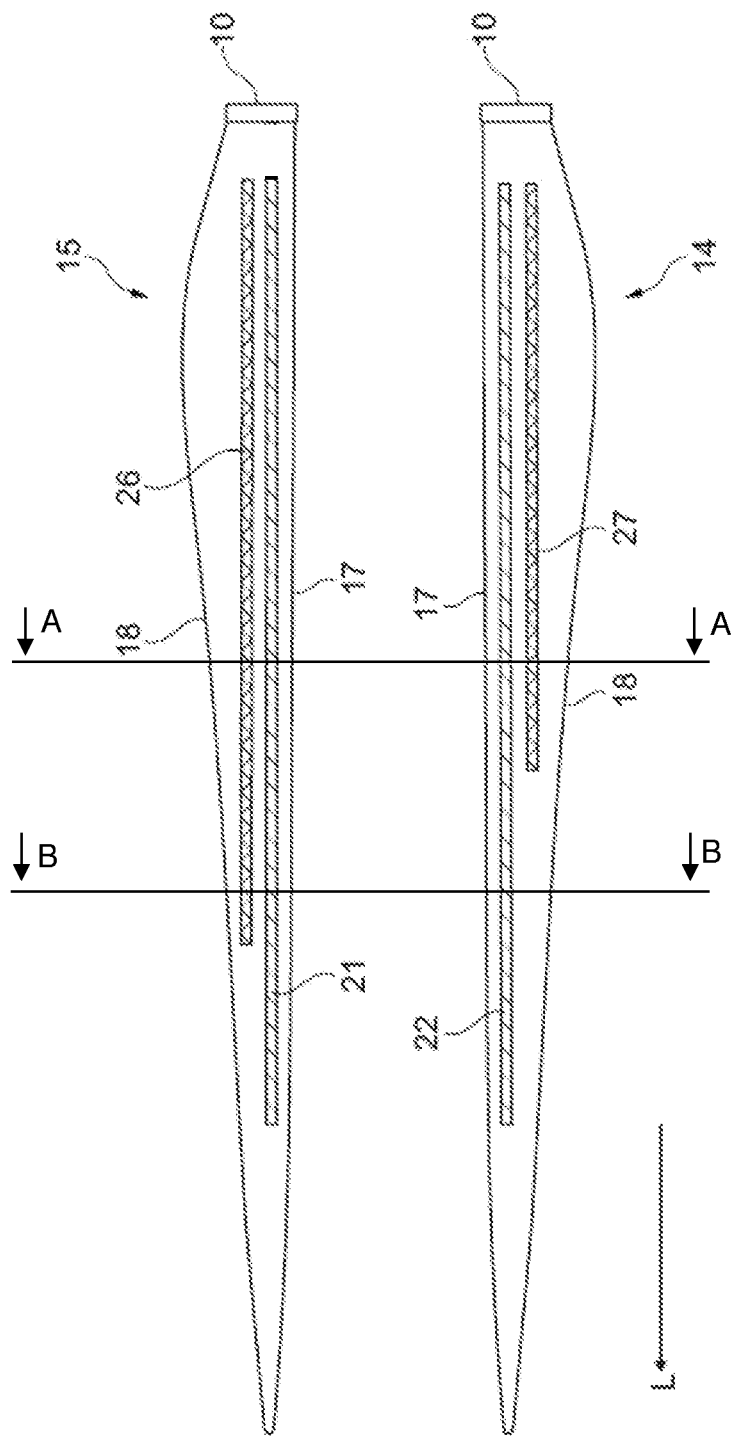
FIG. 3 illustrates a windward shell portion with first and second windward reinforcement structures and a leeward shell portion with first and second leeward reinforcement structures.

FIGS. 2A and 2B illustrate two different cross-sections through an embodiment of a wind turbine blade 7, section A-A and section B-B (see FIG. 3).

The blade 7 extends in a lengthwise direction L (see FIG. 3) between a root end 10 and a tip end 12 of the blade, where the root end 10 (see FIG. 3) is configured for attachment to the hub.

The blade 7 comprises a leeward shell portion 14 and a windward shell portion 15, where each of the shell portions 14, 15 defines respective inner 14a, 15a and outer surfaces 14b, 15b extending in a chordwise direction C between a leading edge 17 of the blade and a trailing edge 18 of the blade. The inner surface 14a of the leeward shell portion 14 faces the inner surface 15a of the windward shell portion 15, whereby a hollow blade is defined by the two shell portions 14, 15.

The blade 7 extends in a thickness direction T between the leeward shell portion 14 and the windward shell portion 15.

The blade 7 comprises a main reinforcement structure 21, 22 comprising a first windward reinforcement structure 21 internally within the blade 7, where the first windward reinforcement structure 21 engages the windward shell portion 15. Additionally, the main reinforcement structure 21, 22 comprises a first leeward reinforcement structure internally 22 within the blade 7, where the first leeward reinforcement structure 22 engages the leeward shell portion 14.

The main reinforcement structure 21, 22 comprising first windward and first leeward reinforcement structures 21, 22 extend in the lengthwise direction L of the blade 7 (see FIG. 3) and have a thickness in the thickness direction T of the blade. The first windward and the first leeward reinforcement structures 21, 22 form a pair and are arranged so that they face each other when the shell portions 14, 15 are assembled to form the complete blade 7.

A first shear web 23 extends in the lengthwise direction L of the blade 7 and bridges the first windward and the first leeward reinforcement structures 21, 22. As illustrated, the first shear web 23 in combination with the first windward and the first leeward reinforcement structures 21, 22 form an I-beam structure/a spar structure which may transfer loads effectively from the rotating blade 7 to the hub 6 (see FIG. 1) of the wind turbine.

The blade 7 further comprises rear reinforcement structure 26, 27 comprising a second windward reinforcement structure 26 and a second leeward reinforcement structure 27 internally within the blade, where the second windward reinforcement structure 26 engages the windward shell portion 15 and the second leeward reinforcement structure 27 engages the leeward shell portion 14. The rear reinforcement structure 26, 27 comprising second windward and second leeward reinforcement structures 26, 27 extend in the lengthwise direction L and are arranged closer to the trailing edge 18 than the main reinforcement structure 21, 22 (see FIG. 3).

The second windward reinforcement structure 26 is longer than the second leeward reinforcement structure 27 in the lengthwise direction, which is illustrated in FIG. 3. It is additionally illustrated by the difference between FIG. 2A and FIG. 2B, where the cross-section A-A illustrated in FIG. 2A is closer to the root end 10 than the cross-section B-B illustrated in FIG. 2B. The longer second windward reinforcement structure 26 is illustrated in both FIG. 2A and FIG. 2B, whereas the shorter second leeward reinforcement structure 27 is only illustrated in FIG. 2A.

A second shear web 28 may extend in the lengthwise direction L of the blade 7 and bridges the second windward and the second leeward reinforcement structures 26, 27.

As illustrated in FIG. 2B, the blade 7 may comprise an additional leeward reinforcement structure 30 which is arranged in continuation of the second leeward reinforcement structure 27 in the lengthwise direction L. The second leeward reinforcement structure may transition into the additional leeward reinforcement structure so that there is not an abrupt change in stiffness in the blade structure.

Each of the first and second leeward and first and second windward reinforcement structures 22, 27, 21, 26 may be formed as a layered structure of a plurality of elements, such as a plurality of pultruded strips of carbon-fibre reinforced plastic. The additional leeward reinforcement structure 30 may be of a different material which preferably has a lower stiffness modulus in comparison to the material of the first and second leeward and first and second windward reinforcement structures 22, 27, 21, 26. The additional leeward reinforcement structure 30 may be formed from glass-fibre reinforced plastic. The glass-fibre material may preferably be provided in the form of dry mats.

FIG. 3 illustrates a windward shell portion 15 with the first and second windward reinforcement structures 21, 26 and a leeward shell portion 14 with first and second leeward reinforcement structures 22, 27. The first and second windward reinforcement structures 21, 26 may be arranged substantially in parallel. Likewise, the first and second leeward reinforcement structures 22, 27 may be arranged substantially in parallel.

The first windward and first leeward reinforcement structures 21, 22 may be of substantially the same length, whereas the second windward reinforcement structure 26 is longer than the second leeward reinforcement structure 27.

The invention claimed is:

1. A blade for a wind turbine, the blade extending in a lengthwise direction between a root end and a tip end of the blade, the blade comprising:
    a leeward shell portion and a windward shell portion, each of the shell portions defining respective inner and outer surfaces extending in the lengthwise direction between the root end and the tip end of the blade and in a chordwise direction between a leading edge of the blade and a trailing edge of the blade, wherein the blade extends in a thickness direction between the leeward shell portion and the windward shell portion, wherein the windward shell portion and the leeward shell portion are each formed of a laminate structure extending from the root end to the tip end;
    a main reinforcement structure internally within the blade, the main reinforcement structure comprising a first windward reinforcement structure engaging the windward shell portion and extending in the lengthwise direction of the blade from adjacent the root end to adjacent the tip end and a first leeward reinforcement structure engaging the leeward shell portion and extending in the lengthwise direction of the blade from adjacent the root end to adjacent the tip end;
    a rear reinforcement structure internally within the blade, the rear reinforcement structure comprising a second windward reinforcement structure engaging the windward shell portion and extending in the lengthwise direction of the blade and a second leeward reinforcement structure engaging the leeward shell portion and extending in the lengthwise direction,
    wherein the rear reinforcement structure is arranged closer to the trailing edge than the main reinforcement structure; and
    wherein the second windward reinforcement structure is longer than the second leeward reinforcement structure in the lengthwise direction.

2. The blade according to claim 1, wherein a length of the second leeward reinforcement structure is in the range of 80-95% of a length of the second windward reinforcement structure.

3. The blade according to claim 1, wherein the second windward reinforcement structure and the second leeward reinforcement structure are formed by a plurality of layers.

4. The blade according to claim 1, wherein the second windward and the second leeward reinforcement structures are formed by layers of pultruded elements.

5. The blade according to claim 1, wherein the respective thicknesses of the second leeward reinforcement structure and the second windward reinforcement structure decrease towards the tip end in the lengthwise direction in a first section of the blade.

6. The blade according to claim 5, wherein the decrease of the thickness of the second windward reinforcement structure is staggered with respect to the decrease of the thickness of the second leeward reinforcement structure at least at one position within the first section.

7. The blade according to claim 1, further comprising an additional leeward reinforcement structure arranged in continuation of the second leeward reinforcement structure in the lengthwise direction, the additional leeward reinforcement structure being arranged closer to the tip end than the second leeward reinforcement structure, and the additional leeward reinforcement structure being formed of a different material to the second leeward reinforcement structure.

* * * * *